United States Patent Office 2,942,997
Patented June 28, 1960

2,942,997
TINTING BASE COMPOSITION

Leonard S. Bram, Iselin, and Louis F. Vecchio, Rockaway, N.J., assignors to Benjamin Moore & Co., New York, N.Y., a corporation of New Jersey No Drawing. Filed Mar. 24, 1958, Ser. No. 723,128

12 Claims. (Cl. 106—308)

This invention relates to compositions of matter which can be used for tinting, coloring, or shading finished coating compositions regardless of the nature of the pigment, resin, or solvent present in the said coating composition.

It is well recognized that many new types of coating compositions have been invented and are being manufactured. Many of these coatings are radically different from each other and are incapable of being intermixed in any proportions without causing unfavorable coagulation or poor homogeneity. The use of these conventional coatings is somewhat limited in cases where customers wish to tint or shade these compositions to colors other than those originally provided by the manufacturer. In order to do this, the consumer has found it necessary to obtain a special colorant which is compatible with the coating composition and which will alter the color without affecting performance of the composition. Thus, for example, a water-thinned composition requires a tinting material which is emulsifiable or water dispersible therein and which will disperse regardless of alkalinity, acidity, or type of emulsified resin or surfactant present in the composition. A solvent thinned composition will require a colorant miscible with the type of solvent, resin, and treated pigment present in said composition.

One object of this invention is to provide a group of fluid colorants of a type which will mix freely with any type of fluid coating composition comprising a mixture of pigment, binder and/or solvent, regardless of the nature of said pigment, binder and/or solvent. The term "binder" includes oxidizing or non-oxidizing oils, waxes, shellacs, lacquers, and any natural or synthetic resin or polymeric materials, whether or not these materials are modified with surfactants, thickeners, colloids, proteins, plasticizers, preservatives, fungicides, and other modifying materials which are involved in the formulation of coating compositions.

Another object of this invention is to provide a colorant composition of the character described which can be incorporated into a clear or pigmented coating composition in any desired concentration. This colorant may be incorporated into the parent coating composition by hand-stirring, shaking, impeller agitation, or any other suitable means.

A further object of this invention is to provide a colorant composition of the character described which, when incorporated into a parent coating composition described and by one of the methods described, is completely compatible with the coating composition and yields a homogeneous product whose color has been altered to the desired degree. The colored product prepared in accordance with the present invention, is uniform in color throughout in the wet state and also in the dry state after application.

It is further intended that after the colored coating composition is applied by brush, spray, roller, dip, knife or any other means of applying a coating, and after the coating has dried, that there be no apparent flocculation of pigment particles or apparent striation or variation in color, gloss, sheen or other visual characteristics deviating from the visual characteristics inherent in the untinted coating composition.

It is further intended that the incorporation of the colorant into the parent coating composition by the methods described and within the limits described shall not produce any deleterious or abnormal effects on the performance or durability of the coating composition. It is intended that the viscosity or consistency of the coating composition shall not be affected to such a degree that subsequent solvent reduction or further addition of viscosity inducing ingredients prior to application is required.

It is further intended that the resultant tinted coating composition be similar to the untinted parent composition in such characteristics as drying time, leveling, ease of application, sheen and color uniformity over surfaces of variable porosity, and on lapping and touch-ups, water and solvent resistance, adhesion, flexibility and other characteristics pertinent to the performance of protective and decorative coatings.

Other objects of this invention will be apparent from the following description and claims.

The composition of this invention is essentially formed by grinding or dispersing colored pigments in a base liquor which in itself is dispersible and compatible in all solvent and resin solutions, emulsions, suspensions and dispersions.

It is understood that each colorant may be based on a different combination of colored pigments and extender pigments so as to allow a wide range of tinting colors. The presence of an extender pigment is not mandatory but is used for economy purposes and to adjust consistency, grinding, and suspension characteristics. The extender pigment used in this invention may be fine, particle size, water-washed, natural calcium carbonate in concentrations up to 65% of the total pigment solids. Other extender pigments, such as talc, clay, mica, quartz and silica, also may be used. Other mineral derivatives may also be used alone or in combination with each other.

The colored pigment used in each colorant may be chosen from a group of prime pigments which in themselves can be incorporated by grinding into any type of natural or synthetic resin, oil or wax, said material being in solution, dispersion suspension or emulsion. Examples of such pigments are those which contain pure, diluted, or extended lead chromate, lead oxide, lead sulfate, lead carbonate, titanium dioxide, zinc sulfide, zinc oxide, lead molybdate, zinc chromate, cadmium sulfide, mercury sulfide, selenium sulfide, chromium oxide, hansa yellow, benzidene yellow, phthalocyanine compounds, synthetic or natural iron oxides, lampblack, bone black, carbon black and ultramarine blue. These pigments must be stable between pH limits of 3.5 and 11.5 and, when incorporated into the base liquor, must be insensitive to crystallization and hydrolysis by themselves or when mixed with other pigments. These pigments must have a maximum water soluble salt content of 0.5%. The quantity of colored pigment in the total colorant varies from 10% to 70% by weight. The quantity of total pigment in the colorant varies from 30% to 85% by weight. By total pigment is meant colored pigment plus the extender pigments. Both concentrations depend on the vehicle absorption and tinting strength of the colored pigment.

The term "base liquor" used herein means the liquid medium in which the colored pigment is to be dispersed. Essentially, this base liquor preferably comprises three principal ingredients:

(1) A first nonionic alkyl or alkaryl lower alkylene glycol ether which is soluble in water, ethylene glycol and polar solvent;

(2) A second nonionic alkaryl lower alkylene glycol ether which is at most partially soluble in water and ethylene glycol, and miscible with aliphatic or aromatic hydrocarbon solvents;

(3) A latent solvent selected from the class consisting of ketones, lower alkylene glycols, lower alkylene mono- or dialkyl ethers, lower alkylene glycol ether esters and mono- or diesters of lower alkylene glycols which is water miscible and completely volatile.

Although not absolutely essential, it is preferred that the "base liquor" contains an aliphatic or aromatic hydrocarbon solvent. In addition to the above, there may also be added a quantity of cationic amine, terpene alcohol and/or anionic soap.

The aralkyl and alkyl glycol ethers mentioned above are chosen for their solubility characteristics. Number (1) above should have complete solubility in water and ethylene glycol and polar solvents and is primarily responsible for the compatibility of these colorants in water-thinned or emulsified coating compositions. Ethers of number (2) above should be only partially soluble or completely insoluble in water and in ethylene glycol and miscible with aliphatic or aromatic solvents or compounds and is primarily responsible for the compatibility of these colorants in coating compositions whose solvent content is primarily non polar or whose resin content is soluble in non polar solvents. The ratio of these ethers of each other is not fixed, but depends on the hydrophile-lipophile characteristics of the pigment used. Some pigments are sufficiently hydrophilic so as not to require any polar soluble ether.

The alkaryl polyglycol ethers discussed above may be expressed by the general formula $$R—(O—R^1)_n\ OH$$

wherein R is an alkaryl radical, and $R^1$ is a divalent alkylene radical, preferably lower alkylene. In a preferred form of this invention the alkyl group of the alkaryl radical is a higher alkyl radical and the aryl portion of this radical is a monocyclic aryl hydrocarbon group. In the case of the water soluble alkaryl glycol ether, $n$ has a lower limit of 9. The upper limit is not critical since the higher polymeric forms of these compounds are also water soluble. However, the preferred upper limit in this instance is 15. In the case of the partially water soluble or insoluble alkaryl glycol ethers $n$ has a maximum value of 8, and preferably 7, and a lower limit of 1.

The alkaryl glycol ethers that are particularly preferred are ethers of nonyl phenol and ethylene oxide condensate. The water soluble ether contains a minimum of 9 moles of ethylene oxide per mole of nonyl phenol and has a minimum molecular weight of 600. The water insoluble glycol ether contains a maximum of 7 moles of ethylene oxide per mole of nonyl phenol and has a maximum molecular weight of 530.

The number of moles of ethylene oxide per mole of nonyl phenol may vary from 1 to 7 in the water insoluble glycol ether and from 9–15 in the water soluble ether. Also, t-octyl phenol may be substituted for nonyl phenol. In this case, 1 to 8 moles of ethylene oxide per mole of t-octyl phenol may be present in the water insoluble ether and 9 to 15 moles of ethylene oxide per mole of t-octyl phenol may be present in the water soluble ether. Also, the ethylene oxide condensate may be replaced completely or in part by a propylene oxide condensate. Furthermore, other ethylene or propylene oxide condensate ethers may be used, the main criteria being the difference in water solubility dependent on total molecular weight and the volatility of polar and non polar fractions of the ether which are dependent on the molecular weight of these fractions.

The content of the mixed polyglycol ethers varies from 10% to 45% by weight of the total colorant. It is intended that upon evaporation and oxidation of the applied film of the coating composition these materials will break at the other linkage and the monomeric residues will be sufficiently low in molecular weight so as to substantially evaporate from the film. The polyglycol ethers employed in this composition are present in the range of 0 to 4.5 parts by weight of water soluble polyglycol ether per part of water insoluble or partially soluble polyglycol ether.

A large variety of alkyl alcohol polyoxyalkylene alcohols may be used as the "first" nonionic glycol ether mentioned above. Above these may be mentioned the trimethyl nonyl ether of polyethylene glycol and the monobutyl ether of mixed poly (18 to 20 moles) alkylene glycols, wherein the alkylene portion is composed of equal moles of ethylene and propylene.

The aliphatic or aromatic hydrocarbon solvent employed herein is present in concentrations from 0% to 17% by weight of the total colorant. The primary function of this material is economy and consistency control. It may be completely eliminated in some colorants, if desired. Examples of suitable hydrocarbon solvents for the above purpose are mineral spirits, naphtha, heptane, xylene and other volatile hydrocarbon solvents.

The latent water miscible solvent or compound is present in concentrations from 4.0% to 11% by weight of the total colorant. The purpose of this solvent or compound is to aid in dispersion and miscibility of the colorant in water-thinned or emulsified coating compositions. This material must be chosen from a group of solvents which are not only water miscible, but also are completely volatile. Also, this solvent must act as a diluent or latent solvent rather than as a true solvent for the coating composition to which the colorant is added so as not to affect viscosity, gloss, or film characteristics. Examples of such solvents are acetone, diacetone, ethylene glycol, ethylene glycol mono or diethyl ether, and glycol ether esters of organic acids.

All colorants except those containing phthalocyanine compounds will require the addition from 0.8% to 5% of an anionic soap which is manufactured by a reaction between stoichiometric amounts of ammoniacal or other compound containing the functional groups —NH—, —$NH_2$—, or —$NH_3$—, and a single or mixture of unsaturated fatty acids exceeding 16 carbon atoms in chain length. Suitable fatty acids are oleic, ricinoleic, linoleic, linolenic, eleostearic, licanic and erucic acids. Suitable compounds containing the functional groups —NH—, —$NH_2$—, or —$NH_3$— are ammonia, morpholine, isopropylamine and other amines. The cationic portion of this compound must for the most part be volatile so as to leave no water soluble residue upon evaporation.

Certain other colorants containing phthalocyanine compounds will require from 0.3% up to 0.9% by weight of a cationic amine and from 2.0% up to 4.5% of a terpene alcohol so as to aid crystal stability of certain pigments. A suitable cationic amine is chosen from a group of high molecular weight imidazolines which may be represented by the following formula:

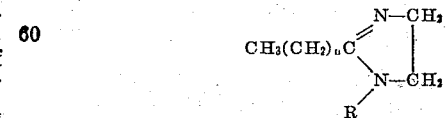

where R is a relatively low molecular weight substitutent such as hydroxyethyl while the alkyl group contains at least ten carbon atoms, i.e., $n$ is at least 9. Total molecular weight is in the range of 250–400. The terpene alcohol must be completely volatile so as to leave no water soluble or non polar solvent residue upon evaporation.

A suitable terpene alcohol is chosen from a group consisting of para-1-menthen-8-ol, beta-terpineol, and related terpene alcohols such as are obtained by dehydrating terpene hydrate. Also, various pine oils may be used as the source of terpene alcohol.

The compositions of the present invention may be made by mixing the ingredients in any suitable manner. However in a preferred form of this invention and in the examples below, the following procedure is followed:

Under continuous agitation we add the prime color pigment to the glycol ethers, followed by the extender pigment, if any. To this paste we add the anionic soap where such is required. This paste is then passed through a roller mill until a 6 Hegeman Gauge grind is reached. The ground paste is then diluted with the aliphatic or aromatic hydrocarbon solvent, followed by the latent water-miscible solvent. Where cationic amine is used, it immediately precedes the prime pigment. If a terpene alcohol is used, it immediately follows the extender pigment before grinding.

The following examples are further illustrative of the present invention. However, it is to be understood that this invention is not restricted thereto.

*Example #1—Yellow colorant*

| | Parts by weight |
|---|---|
| Para-nonyl phenol ether of poly (7½ moles) ethylene glycol (insoluble in ethylene glycol) | 13.2 |
| Para-nonyl phenol ether of poly (12 moles) ethylene glycol (soluble in ethylene glycol) | 2.2 |
| Lead chromate | 53.0 |
| Calcium carbonate | 18.0 |
| Ammonium oleate | 1.3 |
| Mineral spirits (B.P. 307° F.–340° F.) | 6.6 |
| Acetone | 5.7 |
| | 100.0 |

*Example #2—Blue colorant*

| | |
|---|---|
| Para-octyl phenol ether of poly (7 moles) propylene glycol (insoluble in ethylene glycol) | 7.3 |
| Para-octyl phenol alkyl ether of poly (10 moles) ethylene glycol (soluble in ethylene glycol) | 31.8 |
| Hydroxyethylheptadecenyl-imidazoline | 0.8 |
| Phthalocyanine blue pigment (copper phthalocyanine) | 13.5 |
| Calcium carbonate | 22.6 |
| Beta-terpineol | 3.0 |
| Mineral spirits (B.P. 312° F.–396° F.) | 10.4 |
| Diethylene glycol | 10.6 |
| | 100.0 |

*Example #3—Red colorant*

| | |
|---|---|
| Para-nonyl phenol ether of poly (4 moles) ethylene glycol | 28.5 |
| Para-nonyl phenol ether of poly (14 moles) ethylene glycol | 4.0 |
| Synthetic red iron oxide | 47.8 |
| Morpholine linoleate | 2.9 |
| Mineral spirits (B.P. 310° F.–394° F.) | 7.2 |
| Diethylene glycol monoethyl ether acetate | 9.6 |
| | 100.0 |

*Example #4—Green colorant*

| | |
|---|---|
| Para-nonyl phenol ether of poly (4 moles) ethylene glycol | 12.4 |
| Trimethyl nonyl ether of poly (9 moles) ethylene glycol | 12.1 |
| Hydroxyethylhexadecyl-imidazoline | 0.4 |
| Phthalocyanine blue pigment (copper phthalocyanine) | 4.2 |
| Lead chromate | 42.5 |
| Calcium carbonate | 13.2 |
| Isopropylamine ricinoleate | 1.4 |
| Pine oil | 3.2 |
| Naphtha (B.P. 247°–290° F.) | 2.9 |
| Diacetone | 7.7 |
| | 100.0 |

*Example #5—Umber colorant*

| | |
|---|---|
| Para-nonyl phenol ether of poly (7 moles) ethylene glycol | 21.3 |
| Para-nonyl phenol ether of poly (12 moles) ethylene glycol | 4.0 |
| Natural Turkey umber [1] | 57.5 |
| Ammonium salt of soya fatty acids | 2.6 |
| Xylene | 8.2 |
| Methyl alcohol | 6.4 |
| | 100.0 |

[1] 0.3% soluble salts maximum.

*Example #6—Black colorant*

| | |
|---|---|
| Para-ocytylphenoxyethanol—440 molecular wt. | 20.0 |
| Para-octylphenoxyethanol—660 molecular wt. | 3.9 |
| Synthetic black iron oxide | 64.5 |
| Ammonium eleostearate | 4.5 |
| Odorless mineral spirits (B.P. 352° F.–398° F.) | 1.1 |
| Ethylene glycol monoethyl ether | 6.0 |
| | 100.0 |

It can be readily seen that all material in the foregoing examples will volatilize from the final applied film with the exception of the small amounts of anionic soap residue, pigments, and the non-volatile portion of the cationic amine. This leaves the applied film of colored coating composition unaffected except for the additional pigment which has been introduced into the film.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. As a composition of matter a fluid colorant useful in coloring coating composition comprising as the essential ingredients a mixture of:

(a) A first nonionic ether selected from the class consisting of alkyl and alkaryl alkylene glycol ethers which are soluble in water, ethylene glycol and polar solvents and having a range of from 9 to 15 oxyalkylene groups;

(b) A second nonionic alkaryl alkylene glycol ether which is at most partially soluble in water and ethylene glycol, and miscible with hydrocarbon solvents and having a range of from 1 to 7 oxyalkylene groups;

(c) A hydrocarbon solvent;

(d) A latent solvent selected from the class consisting of water soluble and volatile alkyl ketones, alkylene glycols, mono- and di-alkyl ethers of alkylene glycols, mono- and di-esters of alkylene glycols, and ether esters of alkylene glycols; having intimately dispersed therein a pigment said pigment having a maximum water soluble salt content of 0.5% and being made up, at least in part, of colored pigment with the latter constituting from 10% to 70% by weight of the total colorant and with the total pigment constituting from 30% to 85% by weight of the total colorant; said first and second nonionic ethers constituting from 10% to 45% by weight of the total colorant, said second nonionic ether constituting from 7.0% to 30% by weight of said total colorant, said hydrocarbon solvent constituting up to 17% by weight of the total colorant and the latent solvent constituting from 4.0% to 11% by weight of the total colorant.

2. A composition according to claim 1, wherein said first alkaryl alkylene glycol has the formula $R(OR^1)_nOH$ and said second alkaryl alkylene glycol has the formula $R(OR^1)_{n'}OH$ wherein R is an alkaryl radical, $R^1$ is a divalent lower alkylene radical, $n$ is a number having a value of from 9 to 15, and $n'$ is a number having a value of from 1 to 7.

3. A composition according to claim 1, including a cationic amine in amounts in the range of from .3% to .9% by weight of the colorant.

4. A composition according to claim 1, including a terpene alcohol in amounts in the range of from 2.0% to 4.5% by weight of the colorant.

5. A composition according to claim 1, including an anionic soap in amounts in the range of .8% to 5% by weight of the colorant.

6. A composition according to claim 1, including from .3% to .9% by weight of a cationic amine, from 2.0% to 4.5% by weight of a terpene alcohol and from .8% to 5% by weight of an anionic soap.

7. A fluid colorant composition comprising 13.2% by weight of para-nonyl phenol ether of polyethylene glycol prepared with 7½ moles of ethylene glycol, 2.2% by weight of para-nonyl phenyl ether of polyethylene glycol prepared from 12 moles of ethylene glycol, 5.7% by weight of acetone, and 6.6% by weight of mineral spirits (B.P. 307° F.–340° F.) having dispersed therein 71% by weight of pigment having a maximum water soluble salt content of 0.5% and including colored pigment constituting from 10% to 70% by weight of the total colorant.

8. A fluid colorant composition comprising 7.3% by weight of para-octyl phenol ether of polypropylene glycol prepared from 7 moles of propylene glycol, 31.8% by weight of para-octyl phenol alkyl ether of polyethylene glycol prepared with 10 moles of ethylene glycol, 10.4% by weight of mineral spirits (B.P. 312° F.–396° F.), and 10.6% by weight of diethylene glycol, having dispersed therein 36.1% by weight of pigment having a maximum water soluble salt content of 0.5% and including colored pigment in an amount constituting at least 10% by weight of the total colorant.

9. A fluid colorant composition comprising 28.5% by weight of para-nonyl phenol ether of polyethylene glycol prepared from 4 moles of ethylene glycol, 4% by weight of para-nonyl phenol ether of polyethylene glycol prepared from 14 moles of ethylene glycol, 7.2% by weight of mineral spirits (B.P. 310° F.–394° F.), and 9.6% by weight of diethylene glycol monoethyl ether acetate, having dispersed therein 47.8% by weight of colored pigment having a maximum water soluble salt content of 0.5%.

10. A fluid colorant composition comprising 12.4% by weight of para-nonyl phenol ether of polyethylene glycol prepared from 4 moles of ethylene glycol, 12.1% by weight of trimethyl nonyl ether of polyethylene glycol prepared from 9 moles of ethylene glycol, 2.9% by weight of naphtha (B.P. 247° F.–290° F.), 7.7% by weight of diacetone having 59.9% by weight of pigment dispersed therein, said pigment having a maximum water soluble salt content of 0.5% and including colored pigment in an amount constituting at least 10% by weight of the total colorant.

11. A fluid colorant composition comprising 21.3% by weight of para-nonyl phenol ether of polyethylene glycol prepared from 7 moles of ethylene glycol, 4% by weight of para-nonyl phenol ether of polyethylene glycol prepared from 12 moles of ethylene glycol, 8.2% by weight of xylene and 6.4% by weight of methyl alcohol, having 57.5% by weight of colored pigment and having a maximum water soluble salt content of 0.5% dispersed therein.

12. A fluid colorant composition comprising 20% by weight of a first para-octylphenoxyethanol having a molecular weight of 440, 3.9% by weight of a second para-octylphenoxyethanol having a molecular weight of 660, 1.1% by weight of mineral spirits (B.P. 352° F.–398° F.), 6% by weight of ethylene glycol monoethyl ether and having dispersed therein 64.5% by weight of colored pigment having a maximum water soluble salt content of 0.5%.

References Cited in the file of this patent

UNITED STATES PATENTS

| | | |
|---|---|---|
| 1,832,417 | O'Brien | Nov. 17, 1931 |
| 1,987,980 | Sweitzer | Jan. 15, 1935 |
| 2,296,382 | Fischer et al. | Sept. 22, 1942 |
| 2,323,749 | Dieterle | July 6, 1943 |
| 2,379,070 | Evans et al. | June 26, 1946 |
| 2,809,122 | Willis et al. | Oct. 8, 1957 |
| 2,878,135 | Willis | Mar. 17, 1959 |

OTHER REFERENCES

Fischer et al.: "Pigment Dispersion with Surface-Active Agents," Industrial and Engineering Chemistry, March 1943, pp. 336–343.